Feb. 5, 1952     I. B. BENSEN     2,584,663
VARIABLE WARP AIRFOIL
Filed June 27, 1946
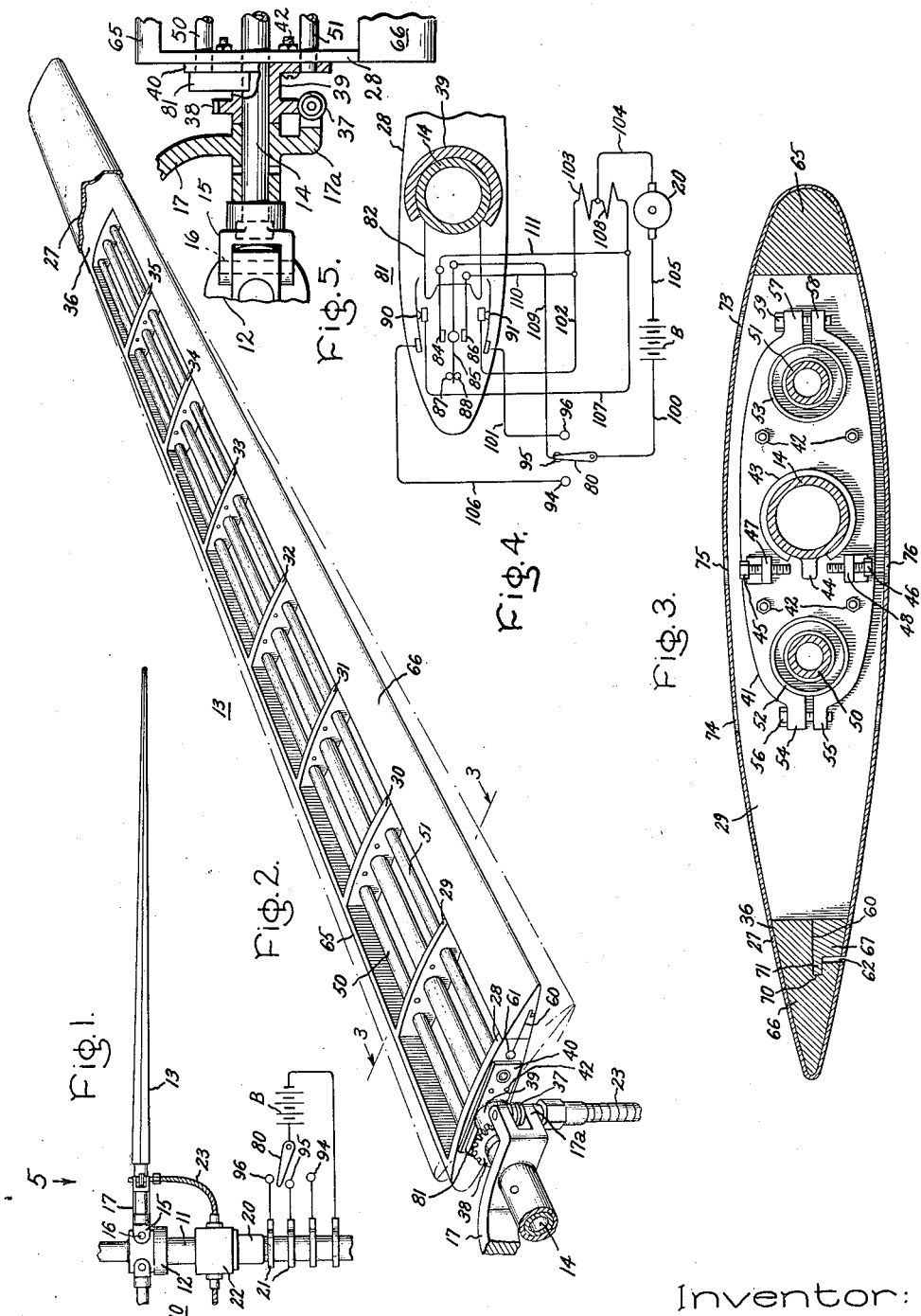
Inventor:
Igor B. Bensen,
by Edwin L. Rich
His Attorney.

Patented Feb. 5, 1952

2,584,663

UNITED STATES PATENT OFFICE 2,584,663

VARIABLE WARP AIRFOIL

Igor B. Bensen, Schenectady, N. Y., assignor to General Electric Company, a corporation of New York Application June 27, 1946, Serial No. 679,789

7 Claims. (Cl. 170—160.24)

The invention relates to variable warp airfoils and particularly to variable warp airfoil blades for aircraft propellers or sustaining rotors or the like.

One of the objects is to provide an aircraft variable pitch propeller or rotor with improved mechanism for warping or twisting the blades retrogressively from root to tip so as to improve the aerodynamic lift distribution under varying pitch conditions.

Another object is to provide improved blade warp control means for obtaining a predetermined positive and negative twist or warp of the blade as well as a predetermined intermediate blade conformation.

A further object is to provide an improved centrifugally extended variable warp propeller blade construction having a variable pitch articulated rotational and pivotal mounting on an aircraft propeller or rotor hub to effect both vertical ascent and horizontal flight of the aircraft.

A still further object is to provide an improved reversible power driven gear mechanism for effecting the warping of the propeller blades.

A specific object is to provide an improved form of warping mechanism for a hollow blade having a twistable envelope with a supporting spar extending therethrough to provide a warp axis and having transverse ribs rotatably mounted on the supporting spar.

Further objects and advantages of the invention will appear in the following description of the accompanying drawings in which Fig. 1 is a partial view of an aircraft propeller or rotor embodying the improvements of the present invention; Fig. 2 is a perspective view partly in section showing the internal construction of the improved variable pitch and warp blade; Fig. 3 is a sectional view of the blade of Fig. 2 along the lines 3—3 showing the rib mounting arrangement of the improved hollow blade warping control mechanism; Fig. 4 is a schematic connection diagram showing a manual selective warp and automatic limit switching control arrangement for operating a reversible electric motor to vary the warp of the propeller blades between a predetermined positive and negative twist or warp and a predetermined intermediate blade warp; and Fig. 5 is a view showing details of the hub connections and of the blade warping drive gear.

As shown in Fig. 1 the aircraft propeller or rotor indicated generally by the reference character 10 is carried by a drive shaft 11 that preferably is of tubular form and rotatably supported in suitable antifriction bearings (not shown). A hub or head 12 is secured to the drive shaft 11 and provided with a mechanism for pivotally and rotatably mounting a pair of oppositely disposed propeller blades 13, only one of which is shown in full in Fig. 1. Each blade 13 is of hollow twistable construction and provided with an integral main supporting and stiffening spar 14 that is rotatably mounted at its inboard end in the yoke 15 which in turn is pivotally mounted on the hub or head 12 by means of the pin 16. The blade supporting spar 14 carries a pitch control arm 17 fixedly secured thereto for rotating the spar in the yoke 15 and thereby varying the pitch of the blade 13. Any suitable pitch control mechanism may be connected to operate the pitch control arm 17. Any suitable form of articulated pivotal and rotational mounting connection between the blade supporting spar 14 and the propeller hub 12 may be provided as desired.

In the preferred form of the present invention the warping or twisting of blade 13 is produced by power means such as the reversible electric motor 20, suitably mounted on the propeller shaft 11 so as to rotate therewith with electric power supplied from battery B to the motor 20, through suitable speed reducing gearing in the gear box 22 to supply power through the two flexible shafts 23 to simultaneously warp or twist the two blades 13.

As shown in Fig. 2 each blade 13 is provided with a hollow twistable envelope or outer skin 27 of suitable aerodynamic shape and formed of relatively thin metal or other relatively flexible material such as plywood to enable a retrogressive warping of the blade to be accomplished. The main supporting spar 14 extends axially through the blade envelope 27, preferably with the axis of the spar coincident with the aerodynamic axis of the blade in order to substantially balance the air reaction forces resulting from variation of blade pitch and twist and thereby reduce the tendency of the blade to flutter. The twistable blade envelope or outer skin 27 is provided with a series of internal transverse supporting ribs 28, 29, 30, 31, 32, 33, 34, 35, each of which is rotatably mounted on the supporting spar 14. Blade 13 also is provided with a relatively rigid tip structure 36 which is fixedly secured to the outer end of spar 14. The pitch of the whole blade 13 is varied upon rotation of the spar 14 by the pitch control arm 17 as previously indicated.

In order to produce and control the warping or twisting of blade 13 in accordance with the present invention, the reversible electric motor driven flexible shaft 23 is connected through suitable power gearing, preferably in the form of a worm 37 and worm gear 38 to rotate the innermost rib 28 of the blade about the warp axis provided by the spar 14. As shown the worm 37 is rotatably mounted in a yoke extension 17a of the pitch control arm 17 and the worm gear 38 is rotatably mounted on spar 14 and rigidly connected through the collar 39 and the reinforcing plate 40 to the rib 28.

As shown in the sectional view of Fig. 3, each of the transverse ribs of the blade 13 is provided with a special bearing mounting and warp control plate 41 that is fastened to the rib by the bolts or rivets 42 and is provided with a bearing bushing 43 for rotatably supporting the rib on the axial spar 14. The spar 14 carries a warp control finger 44, preferably welded thereto with the finger 44 extending between the adjustable stops 45 and 46 carried in suitable brackets 47 and 48 extending from the plate 41.

A pair of warp control elements or tubes 50 and 51 spaced apart on opposite sides of the spar 14 extend through each of the transverse ribs of the blade 13 and are interconnected rigidly to the outer end of the spar 14 by means of the rigid tip of the blade 36. The inner ends of the two spaced apart warp control elements or tubes 50 and 51 are mounted securely in the reinforcing plate 40 to be rotated about the axis of spar 14 by means of the worm gear 38.

As shown more clearly in Fig. 3 provision is made for fixedly securing each of the transverse ribs of blade 13 to the spaced apart warp control elements 50 and 51 so as to bias the blade to a predetermined configuration when there is no twisting force exerted by means of the worm gear 38. Where both positive and negative twisting of the blade is required, the predetermined position just noted is preferably intermediate the maximum positive twist and the maximum negative twist and may be such that the blade has zero twist or warp. To accomplish this result the two warping tubes 50 and 51 are provided respectively with the drums 52 and 53 of considerably increased diameter, each of which preferably is welded to the corresponding tube. The drum 52 is clamped between the two split jaws 54 and 55 formed at the end of the warp control plate 41 when the clamping screw 56 is tightened. In a similar manner drum 53 is clamped between the jaws 57 and 58 when the clamping screw 59 is tightened. Thus in manufacturing the blade, the rib 28 can be mounted on the axial spar 14 in proper alignment with the rigid tip 36 to provide zero blade twist. Thereupon the clamping screws 56 and 59 are tightened to enable the torsional resiliency of elements 50 and 51 to bias the rib 28 to such predetermined aligned position.

In order to provide for the necessary relative longitudinal movement between the trailing edge portions of the blade envelope 27 during the warping or twisting of the blade 13, each of the series of ribs 28–35 is provided with the longitudinal slit 60 terminating in the opening 61 and having a laterally extending portion 62 to permit relative sidewise movement between the opposite halves of each rib 28–35 at the trailing edge thereof. The forward ends of the ribs are tied together by means of a combing strip 65 and the two cooperating trailing edge combing strips 66 and 67 serve to interconnect the trailing ends of the series of ribs on opposite sides of the longitudinal slit 60. By means of this construction the combing strip 66 is enabled to move sidewise relative to the combing strip 67 due to the inherent resiliency of the material of which the ribs are formed. The upper portion of the blade envelope 27 is carried over the trailing edge of the combing strip 66 and fastened thereto adjacent one side of the lateral slot 62 by riveting or in other suitable manner. Similarly the lower portion of the blade envelope 27 is secured to the relatively movable lower portion of the ribs 29 adjacent the opposite side of the lateral slot 62. Separation of the two combing strips 66 and 67 is prevented by suitable means such as the groove 70 formed in the upper combing strip 66 and the tongue 71 extending from the lower combing strip 67 so as to permit longitudinal relative movement of the two but resisting separation thereof.

The manufacture of the blade is facilitated since the individual ribs each may be clamped to the warp control tubes 50 and 51 with each rib in predetermined alignment with the tip 36 of the blade even after the twistable airfoil shaped envelope 27 is applied. This is accomplished by providing suitable small openings 73 and 74 in the blade envelope 27 to permit access to the clamping screws 56 and 57. After proper alignment of each rib is obtained, the access openings 73 and 74 may then be suitably sealed. Likewise similar access openings 75 and 76 are provided in the twistable blade envelope 27 to permit access to the adjustable stop 45 and 46 which by their engagement with the warp control finger 44 carried by spar 14 serve to limit the angular movement of each rib in each direction relative to the spar. Thus when the manufacture of the blade is completed, the exact angular movement permitted each transverse rib of the blade in each direction from the biased intermediate position can be predetermined in order to provide a desired maximum positive twist and also a desired maximum negative twist from the intermediate zero twist position. With the stops on the successive ribs set progressively closer together from root to tip of the blade, a desired retrogressive twisting of the blade is insured from root to tip when the reversible electric warp control motor 40 is energized to operate through the worm 37 and worm 38 to apply a powerful twisting force to the innermost rib 28. This powerful twisting force is transmitted through the reinforcing plate 40 to the spaced apart warp or twist control elements 50 and 51 with the force exerted thereon providing a combined torsional and bending moment. As a result the innermost rib will be rotated on spar 14 the maximum amount and each succeeding rib be rotated a lesser amount corresponding to the adjustment of the stop screws 45 and 46 thereof. As the blade envelope 27 is thus twisted, a relative movement of the combing strips 66 and 67 at the trailing edge of the blade occurs and thus avoids the building up of excessive strains in the blade envelope that might cause wrinkling or crimping thereof.

The improved variable warp blade of the present invention is particularly adapted for use on an aircraft of the vertical lift type disclosed in a concurrent application, Serial No. 679,652, filed June 27, 1946, in the name of D. C. Prince and assigned to the same assignee as the present invention. Certain variable warp, variable pitch blade structures and associated control mechanisms suitable for this convertible flight type aircraft form a portion of the subject matter of this Prince application. My present invention comprises improvements in such blade structures and control mechanism. In this type of aircraft both the blade pitch and twist must be reversed correspondingly. Thus the blade must be given a slight positive pitch and a positive twist in order to provide thrust for vertical ascent of the aircraft like a helicopter with the aircraft hanging on the propeller. When sufficient altitude is gained, both the blade pitch and warp are then reversed in order to drive the aircraft at high speed in horizontal flight. To accomplish this result the pilot must operate the variable blade pitch control mechanism to provide a desired pitch and at the same time operate the manual warp control switch 80 to energize the warp control motor 20 to provide the proper warp for aerodynamic efficiency. Upon rotation of motor 20 in one direction, the worm wheel 38 will be rotated to twist the blade 13 until the corresponding stops serve to limit the rotation of each transverse rib to provide the proper blade twist required to obtain the maximum aerodynamic efficiency of the blade at the corresponding pitch. When the blade pitch is to be reversed, the manual switch 80 then is thrown in the opposite direction to reverse the direction of rotation of the warp control motor 20. Thereupon the blade 13 will be twisted in the opposite direction to the full extent permitted by the stops carried by each rib.

As indicated in Fig. 4 suitable automatic limit switch mechanism 81 may be provided in the motor circuit for deenergizing the motor 20 after each twisting and untwisting of the blade 13 is accomplished. This limit switch mechanism comprises in the preferred form shown a switch base member 82 mounted directly upon the blade supporting spar 14 so as to remain stationary when the rib 28 is rotated on the spar 14. The switch base member 82 carries the three normally spaced apart resilient switch contact arms 84, 85, 86 with the center arm 85 extending between the two actuating pins 87, 88 that are carried by the rib 28. The normally closed limit switches 90 and 91 also are adjustably mounted upon rib 28 so as to move therewith upon rotation of the rib to selectively engage with the stationary switch base member 82 and thereby effect the opening of the corresponding limit switch upon a predetermined rotation of the rib 28 in each direction.

In operation when the manual warp control switch 80 is moved out of engagement with its middle contact 95 as shown in Fig. 4 and into engagement with its right hand contact 96, a circuit is established for energizing the motor 20 to rotate the rib 28 in a clockwise direction about the spar 14 from the position in which it is shown in Fig. 4. This circuit may be traced from the battery B through conductor 100, manual selective switch 80, contact 96, conductor 101, limit switch 91, conductor 102, the clockwise rotation field winding 103 of motor 20, conductor 104, the armature of motor 20 and conductor 105 through battery B. As soon as the motor 20 has rotated rib 28 the required amount to engage the successive ribs with their respective stops, limit switch 91 will be carried into engagement with switching member 82 and thereby open limit switch 91 to interrupt the energizing circuit of the motor. It will be understood that the position of limit switch 91 relative to the rib 28 is adjustable so as to effect the opening of this limit switch when the desired positive twist of the blade 13 has been obtained.

If the manual warp control switch 80 is now thrown out of engagement with contact 96 and into engagement with the opposite contact 94 an energizing circuit for operating motor 20 to reverse the warp or twist of the blade 13 will be established. This circuit may be traced from battery B through conductor 100, switch 80, contact 94, conductor 106, limit switch 90, conductor 107, the counter-clockwise rotation field winding 108 of motor 20, conductor 104, the motor armature 20 and conductor 105 to battery B. In this case when motor 20 has operated to rotate the rib 28 in the counterclockwise direction sufficiently to engage the successive ribs of the blade with their respective motion limit stops, then limit switch 90 will be operated into engagement with member 82 so as to open limit switch 90 and thereby interrupt the motor circuit. It will be understood that limit switch 90 is made adjustable relative to rib 28 so that it will be opened when the desired negative twist of the blade 13 has been obtained.

If now the manual warp control switch 80 is returned into engagement with the middle contact 95, a circuit will be established for operating motor 20 to return the rib 28 to its intermediate warp position in which it is shown in Fig. 4. This intermediate return circuit is under the automatic control of the resilient limit switch arms 85 and 86 which will be in abutting engagement due to the fact that the middle arm 85 is moved by the pin 87 into abutting engagement with contact 86 whenever rib 28 is rotated in the counterclockwise direction from the position in which it is shown in Fig. 4. Thus whenever limit switch 90 is opened contact 85 always will be in engagement with contact 86. Consequently with limit switch 90 open when manual control switch 80 is returned to its mid-position a circuit is established from battery B through conductor 100, switch 80, contact 95, conductor 109, resilient contact arms 85 and 86, conductor 110 and hence through the clockwise rotation motor field winding 103, conductor 104, motor armature 20, conductor 105. The resulting clockwise operation of motor 20 will return rib 28 to its intermediate warp position as shown in Fig. 4 wherein the resilient switch arm 85 will disengage contact 86 to interrupt the motor circuit. Similarly when limit switch 91 is open and manual switch 80 is returned to its mid-position then the energizing circuit for motor 20 will extend through switch arms 85 and 84, conductor 111 and the counter-clockwise rotation field winding 105 of motor 20. The resulting counter-clockwise operation of motor 20 will rotate rib 28 so as to reclose limit switch 91 before separating switch arm 85 from switch arm 84 when the intermediate warped position is reached.

By means of the several improvements provided by the present invention, a powerful, accurate, and selective warping of the blade 13 between a predetermined intermediate position and desired positive and negative warp positions can be obtained. In both the positive and negative warp positions, the relative positions of the successive ribs in the blade are predetermined by the stops so as to provide the maximum aerodynamic efficiency. The intermediate warp position may be zero warp or a slight positive warp suitable for autogyration in case of engine failure.

What I claim as new and desire to secure by Letters Patent of the United States is:

1. An aircraft rotor having in combination a hub, a twistable blade having a main supporting spar fixed to the tip thereof and extending therethrough to provide a warp axis, said spar having articulated pivotal connections with said hub and means cooperating therewith for varying the pitch of said blades, and means including a reversible electric motor having a flexible shaft rotated thereby and gearing driven by said shaft and interconnected between said spar and the root of said blade for twisting said blade around said shaft to warp said blade to predetermined positive and negative warps relative to said tip.

2. A variable warp airfoil having in combination a main supporting spar, a series of ribs rotatably mounted on said spar, an airfoil envelope carried by said ribs with one end of said envelope fixed to one end of said spar, a pair of spaced apart warp control elements extending through and inter-connected with said ribs on opposite sides of said supporting spar, means for rotating the other end of said envelope relative to said spar to warp said airfoil by the force of said warp control elements applied to said ribs and independently adjustable stop means for progressively interlocking said series of ribs with said supporting spar to progressively limit the rotation of said ribs in said series when said envelope is warped.

3. In combination, a reversely variable pitch twistable arifoil blade, blade warping means including a reversible motor, flexible shaft driven by said motor, gearing means interconnected between said shaft and the root of said blade for twisting said blade, selective motor control means for energizing said motor to twist said blade to a predetermined positive warp, a predetermined negative warp, and a predetermined intermediate blade conformation, and pitch varying means separately controllable from said blade warping means.

4. A variable warp airfoil having in combination a twistable envelope having a slot extending through said airfoil envelope for permitting relative movement of opposite sides of said slot during the warping of said airfoil and guide means cooperating with said airfoil envelope for maintaining in predetermined alignment the sections of said airfoil envelope forming the opposite sides of said slot.

5. A variable warp airfoil having in combination a twistable envelope having a slot extending therethrough for permitting relative movement of said envelope on opposite sides of said slot during the warping of said airfoil, and interlocking sliding means within the structure of said airfoil and fastened to said envelope on opposite sides of said slot whereby opposite sides of said envelope remain in alignment and do not separate.

6. A variable warp airfoil having in combination a twistable envelope having in the trailing edge of said airfoil envelope a slot extending spanwise therethrough for permitting relative movement of said envelope on opposite sides of said slot during the warping of said airfoil, said envelope containing interlocking parts forming the sides of said slot and being so shaped as to be capable of movement relative to each other in a spanwise direction but relatively incapable of separation from each other or movement out of alignment with each other.

7. A variable warp airfoil having a supporting spar longitudinally extending therethrough to provide a warp axis, a pair of spaced apart torsion elements each rigidly interconnected at one end with the tip of said spar and extending through said airfoil on opposite sides of said spar, means for rotating the opposite end of each torsion element in the same rotational direction relative to said spar thereby to warp said airfoil, and a series of independently adjustable warp limiting stop means connected between said torsion elements and said spar at longitudinally spaced points within said airfoil for limiting said warping to warp increments retrogressing from root to tip.

IGOR B. BENSEN.

REFERENCES CITED

The following references are of record in the file of this patent:

UNITED STATES PATENTS

| Number | Name | Date |
|---|---|---|
| 1,145,013 | Gallaudet | July 6, 1915 |
| 1,526,230 | Pescara | Feb. 10, 1925 |
| 1,611,717 | Bushyager | Dec. 21, 1926 |
| 2,407,185 | Stalker | Sept. 3, 1946 |
| 2,475,121 | Avery | July 5, 1949 |

FOREIGN PATENTS

| Number | Country | Date |
|---|---|---|
| 15,207 | Great Britain | of 1911 |
| 272,578 | Great Britain | June 9, 1927 |
| 532,399 | France | Nov. 14, 1921 |